United States Patent
Liu

(10) Patent No.: US 11,825,019 B1
(45) Date of Patent: Nov. 21, 2023

(54) CUSTOMIZATION OF ALERTS USING TELECOMMUNICATIONS SERVICES

(71) Applicant: 8×8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 17/878,571

(22) Filed: Aug. 1, 2022

Related U.S. Application Data

(63) Continuation of application No. 17/353,237, filed on Jun. 21, 2021, now Pat. No. 11,412,084, which is a continuation of application No. 16/418,344, filed on May 21, 2019, now Pat. No. 11,044,363, which is a continuation of application No. 15/624,530, filed on (Continued)

(51) Int. Cl.
| | |
|---|---|
| *H04L 12/16* | (2006.01) |
| *H04M 3/42* | (2006.01) |
| *H04W 64/00* | (2009.01) |
| *G06Q 10/1093* | (2023.01) |
| *H04L 65/1059* | (2022.01) |
| *H04L 65/102* | (2022.01) |
| *H04L 65/1053* | (2022.01) |
| *H04L 65/1063* | (2022.01) |

(52) U.S. Cl.
CPC .... *H04M 3/42051* (2013.01); *G06Q 10/1095* (2013.01); *H04L 65/102* (2013.01); *H04L 65/1053* (2013.01); *H04L 65/1059* (2013.01); *H04L 65/1063* (2013.01); *H04M 3/42161* (2013.01); *H04M 3/42323* (2013.01); *H04M 3/42348* (2013.01); *H04W 64/006* (2013.01)

(58) Field of Classification Search
CPC ......... H04M 3/42051; H04M 3/42161; H04M 3/42323; H04M 3/42348; G06Q 10/1095; H04L 65/102; H04L 65/1053; H04L 65/1059; H04L 65/1063; H04W 64/006
See application file for complete search history.

(56) References Cited

U.S. PATENT DOCUMENTS

| | | | |
|---|---|---|---|
| 9,553,755 B2 * | 1/2017 | Anisimov | H04L 9/40 |
| 11,671,533 B1 * | 6/2023 | Liu | H04M 3/5141 |
| | | | 709/227 |

(Continued)

FOREIGN PATENT DOCUMENTS

| | | | | |
|---|---|---|---|---|
| AU | 2008343496 B2 * | 4/2013 | ......... | G06F 15/0225 |
| CN | 105074615 B * | 6/2018 | ............... | G06F 3/01 |

(Continued)

*Primary Examiner* — Richard G Keehn
(74) *Attorney, Agent, or Firm* — Crawford Maunu PLLC

(57) ABSTRACT

Certain aspects of the disclosure are directed to customization of alerts using telecommunications services. A data-communications server is configured to a set of virtual office features including client-specific call routing functions available to remotely-situated client entities based on a subscription. The server is configured to provide to the client entities, a set of instructions written in a first programming language, and to receive from each respective client entity, client-specific sets of control data written in a second programming language. The client-specific sets of control data may specify particular alerts, informational data and/or reminders to be provided to end-users of the respective client entity.

19 Claims, 6 Drawing Sheets

Related U.S. Application Data

Jun. 15, 2017, now Pat. No. 10,298,751, which is a continuation-in-part of application No. 15/240,457, filed on Aug. 18, 2016, now Pat. No. 10,135,974, and a continuation-in-part of application No. 15/240,391, filed on Aug. 18, 2016, now Pat. No. 10,404,759.

(60) Provisional application No. 62/353,977, filed on Jun. 23, 2016, provisional application No. 62/353,971, filed on Jun. 23, 2016.

(56) References Cited

U.S. PATENT DOCUMENTS

| | | | |
|---|---|---|---|
| 2005/0283368 A1* | 12/2005 | Leung | H04M 3/432 704/270 |
| 2009/0129374 A1* | 5/2009 | Yurchenko | H04M 7/1245 370/352 |
| 2013/0024906 A9* | 1/2013 | Carney | H04N 21/44224 725/135 |
| 2013/0290494 A1* | 10/2013 | Goudarzi | H04L 65/1093 709/219 |
| 2015/0120904 A1* | 4/2015 | Shaffer | G06F 9/544 709/224 |

FOREIGN PATENT DOCUMENTS

| | | | | |
|---|---|---|---|---|
| CN | 115136512 A | * | 9/2022 | H04B 7/18519 |
| GB | 2510348 A | * | 8/2014 | H04L 67/1097 |
| GB | 2525413 A | * | 10/2015 | G06F 21/31 |
| WO | WO-2006055714 A2 | * | 5/2006 | G06F 21/121 |

\* cited by examiner

CUSTOMIZATION OF ALERTS USING TELECOMMUNICATIONS SERVICES

OVERVIEW

Aspects of various embodiments are directed to communication and computing services. Voice over Internet Protocol (VoIP) and other telecommunications platforms have allowed individuals to make telephone calls using broadband Internet connections in place of traditional telephone lines. A VoIP endpoint device can use a broadband Internet connection to connect to a VoIP server that is managed by a VoIP service provider. The VoIP server can handle call routing and provide other VoIP services for the VoIP endpoint device.

Computer servers are increasingly being used to provide various services over a network including, but not limited to, VoIP communication services such as VoIP calls, video conferencing, call exchange servers, packet switching, and traffic management as well as non-VoIP services including, but not limited to: website hosting, remote data storage, remote computing services, and virtual computing environments.

The use of VoIP telecommunications services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the telecommunications users.

For business entities, the increased use of VoIP telecommunications services has been particularly complex, largely due to providing the same level of personal features to users from the vantage point of each business entity's telecommunications platform. As examples, a VoIP telecommunications service provider such as 8×8, Inc. can be providing such VoIP services to a multitude of business entities each of which uses the provided services for a customized platform configured to provide telecommunications services to a wide range of employees. For each such customized platform, it can be particularly burdensome for the VoIP telecommunications service provider to adjust and reconfigure the customized platform (of each respective business entity to which such services are being provided) each time a business entity (e.g., as requested by the entity's IT department, employee(s) or others) changes in terms of the employee's communications equipment/endpoint devices.

SUMMARY

Various example embodiments are directed to issues such as those addressed above and/or others which may become apparent from the following disclosure concerning systems and methods for customization of alerts using telecommunications services.

Embodiments are directed toward methods for use in telecommunications systems employing a VoIP server operated by a telecommunications provider. In such systems, the VoIP server includes one or more computer processor circuits (configured with access to databases stored in memory circuits) and configured to act as a telecommunications call-control engine for routing, processing calls and/or providing related telecommunications services on behalf of client entities. Moreover, the call-control engine may be configured to provide customized alerts to the client entities, in a manner specified by the client entities. Such client entities may be exemplified respectively as the above-noted businesses with employees ranging in number from just a few to thousands, and being located/mobile for communications services in any of a multitude of venues. In these embodiments, such methods use the call-control engine to provide such telecommunications services (including customized alerts) by receiving VoIP telephone calls from VoIP endpoint devices, and identifying client-specific sets of control data (e.g., providing directives or commands with call processing data) derived from programming instructions. The programming instructions can be received over a message exchange protocol that is used between the VoIP call routing server and data sources, and correspond to an instruction-configurable/programmable language. Examples of such client-specific sets of control data may include other forms of code providing data and/or instructions over an interface facilitating communication between the telecommunications provider and the VoIP endpoint devices. Such methods execute the client-specific sets of control data to make decisions on how to route calls placed by the VoIP endpoint devices, and to identify a set of instructions (written in a second instruction-configurable/programmable language) associated with the routing decisions. Such methods also execute the client-specific sets of control data to provide customized alerts to the client entities and/or particular end-users of the client entities. The first and second programmable languages may be similar, in that both languages are derivatives of a same type of programmable language, but the first and second programmable languages may differ in terms of content and use. The first programmable language may identify call processing directives provided to the telecommunications provider by the client entity, whereas the second programmable language may identify call routing directives as provided by the telecommunications provider. Such methods execute the set of instructions to retrieve data from the data sources maintained by the telecommunications provider, and provide, in response to the data, call control functionality for the VoIP calls placed by the endpoint device.

Certain embodiments are directed toward a VoIP server comprising one or more computer processor circuits coupled to memory circuits and configured to interface with remotely-situated client entities using a first programming language that defines a message exchange protocol between the VoIP server and data sources. The VoIP server may be configured to provide communication services for a plurality of end-users, each respectively associated with a respective one of the remotely-situated client entities. The VoIP server may also include a call control engine configured to control virtual office features available to the remotely-situated client entities based on a subscription. Such call control engines can receive, from each respective client entity, programming instructions corresponding to a second programming language that is compatible with the first programming language. The programming instructions may be generated by the client entity populating the set of instructions with a set of client-specific directives associated with the virtual office features available to the client entity. In response to an incoming communication directed to an end-user of the plurality of end-users, the call control engine may provide an alert to the end-user specified in the received communication, and based on client-specific sets of control data derived from the programming instructions for the particular client entity.

The above discussion/summary is not intended to describe each embodiment or every implementation of the present

BRIEF DESCRIPTION OF FIGURES

Various example embodiments may be more completely understood in consideration of the following detailed description in connection with the accompanying drawings, in which.

Figure 1:
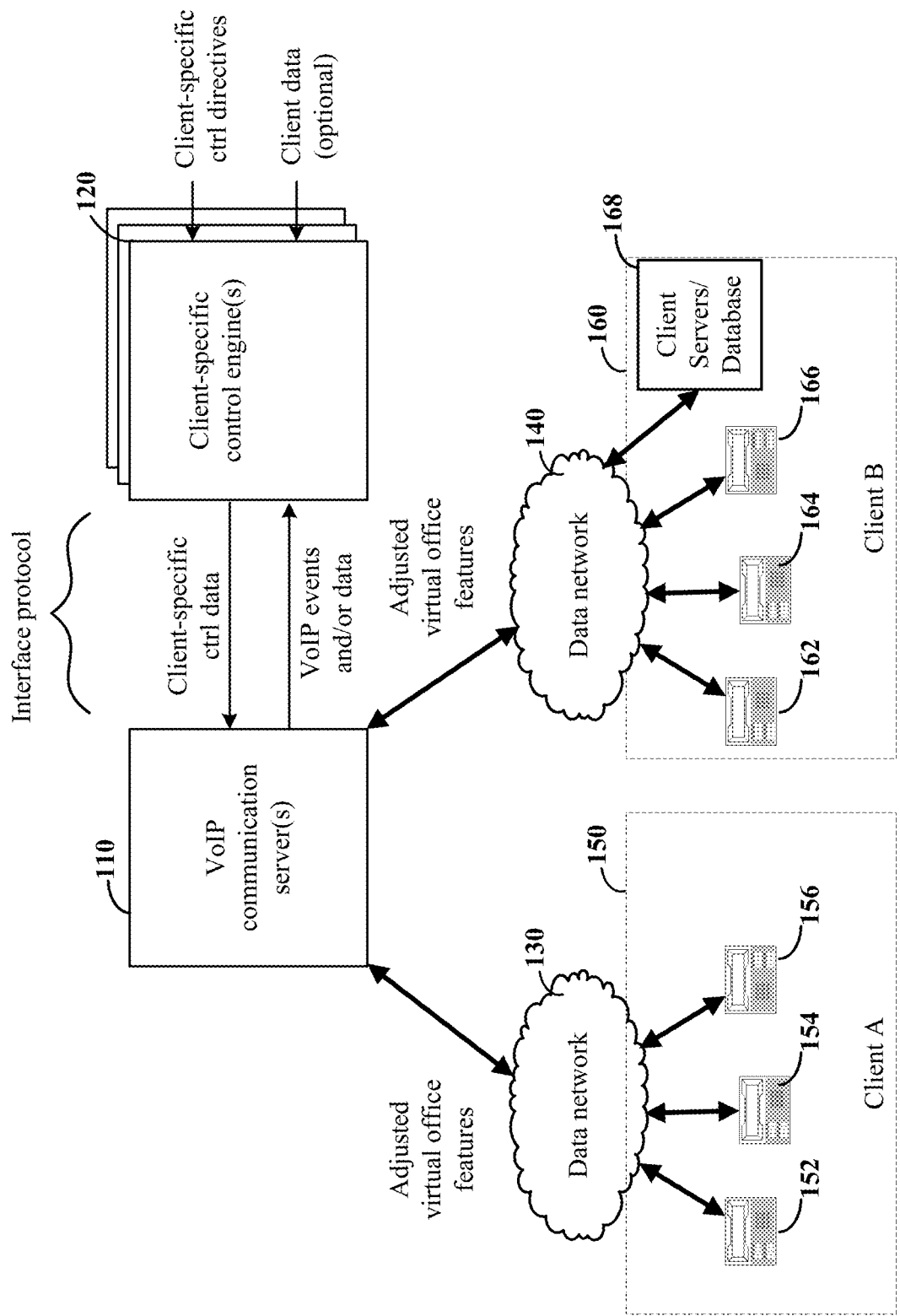
FIG. 1 is a diagram for a VoIP-capable system that uses a high-level programming language for call control functionality and operations, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving customization of shared telecommunications services. In certain implementations, aspects of the present disclosure have been shown to be beneficial when used in the context of providing VoIP communications services. While the present disclosure is not necessarily limited to such VoIP communications systems as described herein, for purposes of facilitating understanding and appreciation of certain embodiments, the following discussion uses such VoIP-based services and systems in the context and on behalf of telecommunications platforms of client entities which subscribe to such services from a VoIP telecommunications service provider (with a server).

For ease of explanation, some examples may be primarily described with reference to VoIP communication servers configured to provide VoIP communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services. Some remote service providers customize their services for different customers. This might include customizable auto attendants, call routing, call forwarding, voicemail, and customization of alerts and reminders for particular clients and/or end-users of the client. For particularly large clients with many different telephone accounts and numbers, implementing and updating these types of customizations can be a significant undertaking. Certain embodiments of the present disclosure are directed toward an interface that allows client-specific control engine to access and dynamically adjust the manner in which remote services are provided for the users of a client account during operation, while maintaining the integrity and security of the underlying system for providing the remote services. More particularly, certain embodiments are directed toward customized reminders and/or alerts using the interface. Such reminders/alerts may allow clients to prompt the interface to provide customized reminders to users. These reminders may be in the form of an email alert, a voice message, a short message service (SMS) and/or other alert/reminder. As described herein, the call routing engine can intelligently select how to provide a message. For instance, the call routing engine may be aware that the end-user device is in a vehicle, and may therefore provide the reminder by voice so as to avoid distracting the end-user while driving. In another example, the call routing engine may interrupt outgoing calls for alert or provide an alternate reminder, such as a call and an SMS message.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination.

According to certain embodiments, a VoIP communication system may be configured to allow a client-specific control engine to dynamically modify and control the call flow and processing at different levels within the system, including (re)routing of incoming calls generally and by way of private branch exchanges (PBXs) and Internet Protocol PBXs (or IP PBXs) to provide intelligent routing relative to receptionists and direct dial numbers for individuals using the IP PBXs. Within these constraints, a customer can write code that self-describes the building blocks or particular configurations used in the customer's particular application, which can be interpreted and executed by the VoIP provider. In various embodiments, the building blocks or particular configurations and the VoIP servers that execute the building blocks or particular configurations can be configured to interface with other sources of data and control. This can include, for example, flow control decisions that are based upon code running on the client side or on the provider side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

Rules of various complexity can be used for routing incoming calls, whether to one or more receptionists, directly to extensions, to voicemail, or for other call routing purposes. The logic used for the routing decisions can be based upon directives and related data shared across multiple PBXs, data that can be dynamically changed, and upon rules and logic that can be defined according to multiple tiers of call routing decisions. For example, a large company may have many different offices or store locations. Portions of the call routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating the VoIP communication system, particularly in situations where there are many thousands of extension rules which can be a difficult proposition. Moreover, a client entity may desire to enable various alerts and/or reminders to be provided to end-users, such that the end-users may more effectively schedule virtual office meetings, attend virtual office meetings and/or other scheduled events, and/or receive alerts and/or reminders associated with other integrated virtual office features. In such a manner, a VoIP server may be provided, which is configured to interface with remotely-situated client entities. The VoIP server may provide communication services for a plurality of end-users, each respectively associated with a respective one of the remotely-situated client entities. The VoIP server, via a call control engine, may control virtual office features available to the remotely-situated client entities based on a subscription. These virtual office features may include customized alerts and/or reminders, such that in response to an incoming communication directed to an end-user of the plurality of end-users, the call control engine is configured to provide an alert to the end-user specified in the received communication, based on the client-specific sets of control data for the particular client entity.

According to certain embodiments, the VoIP communication system provides inbound and outbound call routing for one or more PBXs. A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide direct Inward Dialing (DID) as a service where a telephone carrier provides a block of telephone numbers that are each routed to an IPBX system rather than to individual telephone lines. Using DID, individual phone numbers can be provided to each person or workstation without separate physical lines tied into the IPBX for each possible connection.

According to certain example embodiments, a VoIP system is configured as a Platform as a Service (PaaS) that provides a user with access to, among other things, telephone call routing control, PBX functions, computer telephony integration (CTI), and data analytics (in this context the user can refer to, e.g., person, group, server or CPU, or subscribing business entity). The term "PaaS" refers to Platform as a Service, as exemplified in the context of VoIP systems. PaaS or application platform as a service (aPaaS) is a category of cloud computing services that provides a platform allowing customers to develop, run, and manage applications without the complexity of building and maintaining the infrastructure typically associated with developing and launching an application. PaaS can be delivered as a public cloud service from a provider, where the consumer controls software deployment with minimal configuration options, and the provider provides the networks, servers, storage, OS, 'middleware' (e.g. Java runtime, .NET runtime, integration, etc.), database and other services to host the consumer's application. Similarly, PaaS can be delivered as a private service (software or appliance) inside the firewall, or as software deployed on a public infrastructure as a service. For further information regarding PaaS, reference may be made to U.S. patent application Ser. No. 15/240,391, as well as U.S. patent application Ser. No. 15/240,457, which are fully incorporated by reference.

Embodiments of the present disclosure are directed toward an interface that allows users of the VoIP system solution to access VoIP telephone capabilities of the underlying system, including its hardware and software components, while maintaining the integrity and security of the underlying system. Particular embodiments are directed toward a telecommunications solution that allows for customization of alerts and/or reminders with regard to various virtual office features of the VoIP system. The virtual office features may be adjusted for such end users, while also providing the ability to interface with data sources that are either part of the underlying system or external to the telecommunications solution. These features can be used in combination with a call routing system that can be configured and adjusted in a scalable manner.

The ability to access the underlying VoIP services, including call routing and call control engines, can provide a platform that is both flexible and simple to implement from the viewpoints of both the VoIP provider and the customers of the VoIP provider. The telecommunications solution can be configured to modify the virtual office features available to different end-users, and to control the call flow and processing at all levels within the system, including (re) routing of incoming calls to different PBXs. More particularly, the virtual office features may be customized by client entity, and/or end-user, such that various alerts and/or reminders may be provided to all or a portion of the end-users of a client entity. When compared to an add-on type service where a call is first handled by a separate PBX, the telecommunications solution may offer a number of advantages and additional features including, but not limited to, increased call routing capabilities, scalability, and reduced complexity. For instance, the telecommunications solution allows a VoIP client having multiple end-users to customize the various virtual office features provided to the end-users, without compromising the security of the underlying system or requiring additional customization by the VoIP provider.

The VoIP servers providing the underlying function for the VoIP system can be configured to utilize a programmable (or configurable) communication protocol such as a high-level, domain-specific programming language as might be implemented with respective VoIP servers providing VoIP call routing and IP PBX functions on respective sides of an interface configured to facilitate the communications via the defined protocol. A particular example of a VoIP server may use session initiation protocol (SIP) to handle various call functions (e.g., call setup and tear down). However, the various embodiments discussed herein are not necessarily limited thereto. Consistent with the above and in other embodiments disclosed herein, the VoIP servers can be configured to establish a leg of the call from the VoIP endpoint devices (or dial peers) to another VoIP endpoint device or to endpoints on the PSTN through use of a VoIP-PSTN gateway.

According to more specific example embodiments, a high-level domain-specific programmable communication protocol (e.g., specific to customer-entity domains) uses one or more languages which are defined using a markup language as the basis for the language structure. Particular implementations relate to the use of at least two domain-specific languages, one that can be used for initial call routing and the other for providing more complex and specific call processing functions. More particular example embodiments use an eXtensible Markup Language (XML). An XML model defines the constraints on the high-level language, including defining the set of valid commands that can be carried out by the VoIP servers. Within these constraints, a customer can write XML, code that self-describes the building blocks or particular configurations used in the customer's particular application. For instance, a common set of instructions, written in the high-level language (e.g., an XML language) may be provided by a VoIP provider to client entities. The common set of instructions may form a template to be populated with client-specific directives, the populated template forming programming instructions that instruct the VoIP provider how a particular client entity is to be configured for various VoIP services. In such a manner, the VoIP provider may provide a lightweight and simplified set of instructions to client entities, and client entities may provide the VoIP provider with instructions to customize the virtual office services for that particular client entity. XML also allows for various different data structures to be embedded into the XML document or file. For example, a script written in JavaScript can be embedded as character data that the VoIP servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as high-level markup languages (e.g., XML derivative languages or XML-type languages).

Various examples of such XML derivative languages are exemplified in U.S. patent application Ser. Nos. 15/377,778 and 15/377,797 filed on Dec. 13, 2016, and entitled "Region-based connecting of calls using client-specific control and provisioned numbers" and "Region-based bridging of calls using client-specific control and revised caller identifiers" (respectively) which are fully incorporated by reference herein. In certain example VoIP applications, two XML-type languages are implemented as a call processing XML and a call routing XML, respectively as XML derivative languages corresponding to XML but customized for processing VoIP calls on the side of the interface operating on behalf of customer entities and on the other side of the interface for higher level processing (including, for example, call routing) by the VoIP service provider. For further application-specific examples of such XML-type customization, reference may be made to discussion of CPXML and CRXML as disclosed in U.S. patent application Ser. Nos. 15/377,778 and 15/377,797. Such XML derivative languages can be written specific to types of functionality as needed for various customer entities, thereby allowing developers to program call processing logic or service execution logic with both XML building blocks and JavaScript/TCL, or other scripting languages best suited to levels (e.g., in terms of quantity range) of a customer's endpoint devices and/or in terms of complexity of the VoIP-based media functionality and evolving demands expected by a customer. In certain implementations, XML derivative languages allow VoIP customer developers to program and integrate VoIP call flow (e.g., as provided by a cloud-based VoIP service) with customer or third party application servers and databases. In particular, the call flow can include a connection that is used as part of call routing decisions and call processing options that are related to one or more receptionists that can answer calls to a group of endpoint devices. The system allows different levels of call control logic to be implemented in a manner that can facilitate scalability of the system of large organizations with many endpoint devices and/or end-users and with complex organizational structures that have corresponding complex call routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related telecommunications data can be provided in documents corresponding to other languages and/or communications protocols; for example, one such programming language can be used for initial call routing and another programming language can be used for providing more complex and specific call processing functions. For more general information regarding implementation and control relating to such client-directed telecommunications services (and more specifically interface/communications implementations), reference may be made to U.S. Patent Application Ser. No. 62/353,971 filed on Jun. 23, 2016, and entitled "Client-Specific Control of Shared Telecommunications Services", U.S. patent application Ser. No. 15/240,391 filed Aug. 18, 2016, and entitled "Client-Specific Control of Shared Telecommunications Services", U.S. Patent Application Ser. No. 62/353,977 filed Jun. 23, 2016, and entitled "Client-Specific Control of Shared Telecommunications Services", and U.S. patent application Ser. No. 15/240,457 filed on Aug. 18, 2016, and entitled "Client-Specific Control of Shared Telecommunications Services", which are fully incorporated by reference herein. As discussed above, instead of or in combination with such XML-type languages, these other implementations may be realized as being suitable for serving telecommunications with different size and/or complexity metrics as needed to provide adequate telecommunications service to customer entities.

According to particular embodiments, a call control engine can respond to a call, or other event, by sending requests to a web server and get derivative documents (e.g. a set of instructions) for processing (providing a set of directives or instructions for taking action), thereby operating in a stateless manner that is similar to how an Internet browser, or similar interface uses Hypertext Markup Language (HTML). The call control engine can interpret a received derivative document to identify building blocks that are then rendered (i.e., executed). Each building block can define logic relating to one or more functions, such as for voice, call control, and flow control logic. The call control engine may also execute other types of code, such as JavaScript, to create dynamic content (e.g., dynamically generated) for client-side flow control. Each derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the VoIP server provider's cloud database). This information can then be used to drive call flow or call control functionality and decisions.

As applicable to routing decisions relating to receptionists, an incoming call can be processed according to a high-level programming document with instructions (e.g., programming instructions, from which client-specific sets of control data are derived) for determining whether calls route to a receptionist, directly to a called endpoint device, or are routed and processed in some other manner. As an example, the high-level programming document could include a set of global rules for determining how to handle calls to endpoints of a customer (e.g., a large business with many individuals and corresponding endpoint devices). High-level programming documents can also specify local rules for routing calls (e.g., to endpoint devices, voicemail, auto call attendants), or otherwise processing the call. The local rules might be used if global rules specify that the call is not routed to a receptionist, or if the receptionist rejects or forwards the call on. Each of the local and global rules can be driven, at least in part, by data retrieved from a data source, such as a client server or database. As an example, the global rules could access a customer database that includes lists of caller IDs that are handled differently. The call routing VoIP server does not need to have direct access to the lists of caller IDs (which might be confidential lists and thereby represent a security risk if shared directly with the VoIP server). Rather, the VoIP server can send a query that includes a specific caller ID number of an incoming call. In response to the query, information can be provided that indicates how to process the call (e.g., whether to route the incoming call to a receptionist or directly to the dialed endpoint device).

According to various embodiments, the high-level programming language allows a programmer access to the telecommunications solution by way of a controlled and limited set of call control functionality in the form of call processing and routing operations. The limitations on the operations can be particularly useful for allowing programming control to be placed into the hands of different customers of the provider of the VoIP servers. For example, the provider can update or make other changes to how the VoIP servers are configured without requiring modification to documents written to use the high-level language, which might otherwise be required to account for the changes. Moreover, the VoIP servers and their data can be protected from poor programming decisions (intentional or otherwise) by tightly controlling the extent that the documents provide control of, or access to, the inner workings of the VoIP servers. In a similar manner, in various embodiments, the VoIP customer can update or make changes to the various virtual office features that are provided to end-users to provide a customizable solution for each VoIP customer and their respective end-users. For instance, a VoIP customer may provide customized instructions directing the VoIP provider to send an alert to an end-user or group of end-users when certain criteria are satisfied, such as when a particular group milestone is achieved. As another example, the VoIP customer may provide instructions directing the VoIP provider to integrate a calendar application (such as Outlook, or Google calendar, etc.) with the virtual office features, such that end-users receive reminders via the VoIP system regarding events scheduled in the calendar application.

In example embodiment, a VoIP provider server may be configured to provide customized virtual office features (e.g., VoIP services) to clients of the VoIP telecommunications provider. The VoIP provider server may include one or more computer processor circuits coupled to memory circuits and configured to interface with a plurality of remotely-situated client entities. The VoIP provider server can be configured and arranged to provide a database with a set of virtual office features including client-specific call routing functions. The set of virtual office features, including call routing functions, may be available to remotely-situated client entities based on a subscription provided by the VoIP telecommunications provider. The VoIP server can provide to the client entities, a set of instructions written in a first programming language that defines a message exchange protocol between the VoIP provider server and data sources.

The set of instructions can include aspects and/or portions that are to be populated (e.g., supplemented) with client-specific directives associated with virtual office features available to client entities. For example, the VoIP provider server can provide to each client entity, a common set of instructions defining various aspects of virtual office features provided to the client entities. This set of instructions may serve as a sort of template, or default configuration, of virtual office features provided to the client entities. In turn, the client entities may provide to the VoIP provider server, programming instructions from which client-specific sets of control data are derived, which allows the VoIP provider server to customize the virtual office features provided to each particular client entity. The programming instructions can be written in a second programming language that is compatible with the first programming language (e.g., that language in which the set of instructions from the VoIP provider are written in). Moreover, the programming instructions can be generated by the client entity (by a client-specific control engine) by populating or combining the set of instructions received from the VoIP provider server with a set of directives associated with the virtual office features available to the client entity. Client-specific sets of control data, derived from the programming instructions and received by the VoIP provider server, can be used to provide an adjusted set of features to end-users of the client entities (e.g., based on and according to the client-specific sets of control data). In such a manner, the client entity may specify additional and/or different virtual office features to be provided to the end-users of the client entity. For instance, the client entity may specify particular conditions under which the end-users are to receive alerts, such as alerts from other applications integrated with the VoIP system. Similarly, the client entity may enable customizable reminders for the end-users, such that the end-users may configure reminders to be sent to the end-users at the occurrence of particular events. In response to receiving an incoming communication directed to an end-user, the VoIP provider server may provide an alert to the end-user specified in the received communication, based on the client-specific sets of control data for the particular client entity.

The adjusted set of virtual office features may be a subset of the virtual office features to which the client entity has subscribed. For example, a client entity such as a fitness company may subscribe to a particular set of telecommunications services hosted by the VoIP server. The client entity may have a number of franchises located in different geographic regions, and each franchise location may have different needs for telecommunications services. As such, the client entity may wish to provide different types and/or different configurations of VoIP services for its different franchise locations. In such a manner, the VoIP server may provide an adjusted set of features to end-users of the client entities according to client-specific sets of control data. In another non-limiting example, the client entity may utilize a number of PBXs or IPBXs, and may segment the various end-users among the different PBXs, such that incoming calls are routed to one of the many PBXs associated with the client entity. Further, the client entity may configure the virtual office features for the various end-users such that end-users may receive alerts and/or reminders from the VoIP system in an intelligent manner. For instance, the client entity may configure the VoIP system to identify a location of the end-user, such as if the end-user is in a moving vehicle, and to provide alerts and/or reminders to the end-users in a particular format (such as voice message) in response to the determination that the end-user is in a moving vehicle. The client entity may further configure the VoIP system to allow end-users to customize reminders that are sent to other VoIP endpoints and/or external numbers. For instance, the client entity may enable a particular feature of the virtual office features that allows end-users to send a prerecorded voice message to a recipient. The end-users may record a voice message reminding a particular individual of an upcoming appointment, the date and time of the appointment, and the location of the appointment. The recorded voice message may be sent to the recipient (either another VoIP endpoint device, or an external number), and provided to the recipient in a format defined by the client entity.

In an example, a client entity may submit a request to the VoIP system via a particular URL defined by the VoIP system, the request including instructions to invoke an application programming interface (API) and to pass appointment reminder information to a customer (of the client entity, who may be external to the VoIP system). The API makes a call from a target address of the client entity, to a target destination number of the customer. In the body of the request submitted by the client entity to the VoIP system, the client entity can specify what the appointment reminder should say, such as "John smith, you have an appointment on December 12th at 10:30 am at 1111 Pleasant Drive, South Building, Second Floor, with Doctor James." The VoIP provider server connects to the target destination number (the customer of the client entity), and routes the call to the target address (the client entity) and loads the prerecorded message with the voice reminder. The request to send the reminder to the customer (from the client entity) may be written in the second high-level programming language, as discussed herein. Moreover, the client entity may configure the reminder such that an in-session VoIP call of the customer (e.g., recipient) is interrupted by the alert/reminder. Such interrupt may be provided by a voice message that temporarily interrupts an ongoing call, and/or a written message (such as email message and/or SMS message) that interrupts the ongoing call without affecting call quality.

The programming instructions provided by each respective client entity may define aspects of the set of adjusted virtual office features provided to that particular client entity. As described herein, the programming instructions received by the VoIP provider server from the client server may be written in a programming language that defines a message exchange protocol between the VoIP provider server and data sources. For instance, the programming instructions, written in the programming language, may specify call handling procedures to be implemented for end-users of the client entity, or a manner in which the VoIP services may integrate with other network applications used by the client entity (e.g., client-specific network applications), among other examples. Data from the client-specific network applications may be imported to the virtual office features. For instance, contacts from a client-specific email application may be imported to the virtual office features, allowing those same contacts to be accessed using the VoIP system. In another non-limiting example, end-users may schedule conference calls using the VoIP system and by importing data from a client-specific calendar and/or scheduling application. The client entity may configure the virtual office features provided to the end-users, and the network applications integrated therewith, to alert end-users and/or provide reminders to the end-users under certain circumstances and/or in response to particular criteria being satisfied. For instance, the client entity may configure the VoIP system to provide an alert to end-users in at least one format including email message, voice message, and SMS message. The client entity may specify conditions under which such alerts and/or messages are provided to the end-users. For example, the client entity may specify that alerts and/or messages are to be sent to end-users via both email message and SMS message when an incoming communication is received from particular individuals.

The client-specific sets of control data, derived from the programming instructions provided by the client entity, may define various aspects of the virtual office features provided to end-users of the client entity. For instance, the set of directives may define handling procedures of phone calls and/or conference calls for end-users of the client entity. The client-specific sets of control data may define a manner in which phone calls to and/or from the end-users are routed upon receipt. Similarly, the client-specific sets of control data may define a call queue process for calls placed to the end-users, and/or designate an automated call attendant to route VoIP calls placed to the end-users. For example, a VoIP client may instruct a VoIP provider to configure the client to queue incoming calls, to assign incoming calls to one or a plurality of call queues purchased according to a subscription, and to limit a number of calls to be placed in each of the call queues. The VoIP client may also instruct the VoIP provider server to configure the client entity to create subgroups of end-users, such that incoming calls may be routed to a particular subgroup of end-users. In such a manner, a group of end-users may share the distribution of incoming calls. Such subgroups may be defined by business unit, by geographic location, and/or by a language spoken by the end-users, among other examples.

In some examples, the client-specific sets of control data may define at least one call center to receive VoIP calls placed to the end-users, where the call center routes the received VoIP calls according to the client-specific sets of control data. The call center may provide a greeting upon receipt of incoming calls, and provide customized call routing options for the end-users of the client entity. For instance, after playing a prerecorded greeting, the call center may provide call routing options based on the client-specific sets of control data associated with the client entity, such as extensions for particular business units, a company directory, and/or an option to dial a particular extension.

The client-specific sets of control data may also define system integration processes. Each client entity may utilize a number of network applications to support daily operations. For instance, the client entity may utilize an email application, an appointment scheduling application, and/or a messaging application, among other examples. The adjusted virtual office features provided to the end-users by the VoIP server may be configured to define a manner in which the adjusted virtual office features operate in collaboration with the different network applications of the client entity. For example, the virtual office features provided by the VoIP server may collaborate with the client's email application, allowing end users to call contacts from their email application using the virtual office features. Similarly, the virtual office features may be customized for the client entity such that the adjusted virtual office features provide alerts to end-users when messages, correspondence or other forms of communications are received via network applications of the client entity. Such alerts may be indicative of operations of the network applications of the client entity. For instance, the adjusted virtual office features provided by the VoIP server may allow an end-user to receive an alert when a communication is received from a contact on a social media site, and/or to retrieve information for a particular customer from a customer relationship management (CRM) application when a call is received from the particular customer.

Further, client-specific sets of control data customize the virtual office features provided to end-users by defining a manner in which the set of adjusted virtual office features are accessed by mobile devices of the end-users. For instance, client-specific sets of control data, derived from programming instructions provided by the client entity, may allow end-users of the client entity to access virtual office features on their smartphone and/or tablet device. The client-specific sets of control data may specify particular configurations for the virtual office features based on an operating system of the mobile device and/or processing speeds of the mobile device, among other examples. For instance, the client-specific sets of control data may specify a format for providing alerts and/or reminders to the various devices of the end-users. The client entity may provide programming instructions allowing end-users to receive calendar alerts inviting them to join a virtual meeting that is tentatively scheduled in the integrated calendar application of the end-user.

In various embodiments, a VoIP client server may be provided, comprising one or more computer processor circuits coupled to memory circuits and configured to interface with the VoIP provider server. As described herein, the VoIP provider server can be configured to provide a database of virtual office features available based on a subscription. Similarly, the VoIP client server can receive from the VoIP provider server, a set of instructions written in a first programming language that defines a message exchange protocol between the VoIP provider server and data sources. The VoIP client server can further generate programming instructions corresponding to a second programming language that is a subset of the first programming language. The second programming language may be considered a subset of the first programming language, and is associated with virtual office features available to the client entity. For instance, the client-specific sets of control data, derived from the programming instructions corresponding to the second programming language, may further define and/or adjust the virtual office features provided to a client entity and/or end-users of the client entity. For example client-specific sets of control data may define an alert or reminder to be provided to or on behalf of the client entity. The VoIP client server may facilitate sending of the alert or reminder to end-users based on the client-specific sets of control data and in response to receipt of an incoming communication. For instance, the VoIP client server may generate an alert or reminder request based on client-specific sets of control data that define when and/or how an alert and/or a reminder is to be sent to particular target destinations (such as other endpoint devices within the VoIP system and/or customers of the VoIP client which may be external to the VoIP system). The VoIP client server may provide to the VoIP server (e.g., of the VoIP provider) a target destination number to which the message is sent, along with information specifying a message for the target destination number and a format for delivery of the alert or reminder. For instance, a client entity may provide to the VoIP client server, programming instructions (from which client-specific sets of control data is derived) that request appointment reminders to be sent to customers, at a target destination number such as a phone number, an email address, or other identifiable address associated with the customer, within a particular timeframe of an upcoming appointment. These programming instructions may be provided in the second programming language such that the VoIP provider server may easily and efficiently implement the particular request.

The VoIP client server can transmit to the VoIP provider server, programming instructions in the programming language such that the adjusted virtual office features may be configured. The VoIP client server can access the set of adjusted virtual office features provided by the VoIP provider server. In some instances, the client entity can allow the VoIP provider to indirectly access data sources of the client entity. For example, the client entity can specify, via a second set of client-specific control data derived from the programming instructions, a URI that points to the VoIP client server and specifies an associated query. The VoIP client server can execute, for example, a local script that may rely upon customer data. The script can generate a response in the particular programming language, and the VoIP provider server can then carry out call routing, or other call control functions, based upon the response and without ever having direct access to the customer data. As such, the VoIP client server can be configured to provide programming instructions instructing the VoIP provider to retrieve data from the data sources based on the accessed set of adjusted virtual office features. The VoIP client server may provide, in response to the retrieved data, call control functionality to end-users of the client entity based on the accessed set of adjusted virtual office features. In such a manner, the VoIP client server may facilitate sending of an alert or reminder to end-users based on the client-specific sets of control data and in response to receipt of an incoming communication. For example, the VoIP client server may be configured and arranged to generate a reminder including a prerecorded voice message (e.g., "John Smith, you have an appointment on January 5th"), and to load the prerecorded voice message from a pre-defined location in response to a request from the VoIP server. When executing the instructions to provide an alert and/or a reminder to a target destination, the VoIP server may first connect to the target destination number, then connect the target destination number on the established VoIP call with the address of the client entity (e.g., via the VoIP client server). The VoIP client server may instruct the VoIP server to retrieve the prerecorded message from a defined location, such that the target destination number receives the prerecorded message from the VoIP server and on behalf of the client entity.

Consistent with various embodiments of the present disclosure, programming instructions provided by the VoIP client server to the VoIP provider server may define various aspects of the virtual office features provided to client entities and/or end-users of client entities. For instance, a client entity may wish to provide different virtual office features to different subgroups of end-users, and/or to configure different virtual office features differently for different subgroups of end-users. Such subgroups may differentiate administrators that have access to additional virtual office features from non-administrators that should not have access to such additional features. Similarly, such subgroups may differentiate different business units of end-users that have different needs for virtual office features compared to other business units. As such, client-specific sets of control data may define a plurality of end-user subgroups of the client entity, and the VoIP client server may be configured to provide access to the set of adjusted virtual office features according to permissions of the end-user subgroups. Similarly, the client-specific sets of control data may define a plurality of data subscriptions to be included in the set of adjusted virtual office features, and the VoIP client server may be configured to access the plurality of data subscriptions using the VoIP provider server. Consistent with such example embodiments, the client-specific sets of control data may define a default contact list to be included in the set of adjusted virtual office features, and the VoIP client server may be configured to access the default contact list using the VoIP provider server. In such a manner, specified subgroups of end-users of the client entity may have a defined list of default contacts that are readily accessible using the adjusted virtual office features, without additional configuration by the VoIP provider. Such contact lists may be used by the VoIP client server to send an alert or a reminder to a subgroup of end-users in a quick and efficient manner. For instance, a client entity may desire to send an alert to all end-users on a particular campus or portion of a campus alerting them of an emergency condition. The client entity may provide the alert to the end-users, via the VoIP provider server by providing the VoIP provider server with programming instructions corresponding to a second programming language. Client-specific sets of control data may be derived from the programming instructions for retrieval and implementation by the VoIP provider server. The client-specific sets of control data may define the message to be sent to the end-users, a manner in which the message is to be sent, and criteria for when to send the message. In an example, the client entity may create an alert that directs the VoIP provider to send a weather alert to all end-users on a campus when information from a weather monitoring application indicates severe weather is approaching the campus, and the client entity may specify that the alert is sent by email, by SMS message, and also by voice message to ensure that all end-users receive it. In another example, the client entity may create a reminder that directs the VoIP provider to send a message from one end-user to another end-user, including a reminder of an upcoming meeting appointment, in response to identification of information in a scheduling application indicating that the two end-users have a scheduled meeting. Examples are not so limited, however, and different and/or additional alerts and/or reminders may be provided to or on behalf of the client entity, as specified in the client-specific sets of control data.

Client-specific sets of control data may be generated responsive and according to client-specific directives. Consistent with the above-characterized embodiments, at the client side of the VoIP communications services, the client's computer-based processing resource (e.g., by the client-specific control engine) generates and submits programming instructions (from which client-specific sets of control data are derived) for assessment and use by the VoIP communications service provider. In a typical implementation, these programming instructions can be realized using codes or one or more commands (or a script of program-created commands). As examples, such codes or command sets can be implemented using a variety of programming control approaches. These approaches include, for example, a programming language (such as C++, XML, JAVA, HTML, SQL, etc.) common to both the client-specific control engine and to the VoIP communications service provider, which receives the programming instructions (submitted from the client side) for adjusting the VoIP communications services being provided to the submitting client.

By using a common interface protocol (e.g., the programming language, codes or command sets) which is understood by the VoIP communications service provider, authentication and updating for added (telephony) services is readily achieved automatically and remotely without burdening the VoIP communications service provider with cost-intensive set up procedures. Depending on the level of services being added/changed for each client, and/or depending on the client's manual-operator and/or automated technology, the programming instructions can be generated and submitted in various (coded) ways such as described above and also, for example, by dial tone input generated remotely on behalf of each client, by smartphone app specific to the client, by voice recognition, or combinations thereof. The client-specific sets of control data for a particular client entity may be generated based on various data metrics including, for example, VoIP call events or data received from the VoIP communication server, client-specific directives received in the form of user input (e.g., input via dial-tones and/or GUI), data acquired from a client (e.g., from a client database), and/or data provided by third parties (e.g., third party monitoring services).

Consistent with embodiments of the present disclosure, a method for use in a VoIP telecommunication system may be provided. The method may include receiving from a VoIP server, a set of instructions written in a first programming language that defines a message exchange protocol between the VoIP provider server and data sources, and event data for routed VoIP calls. As described herein, the VoIP server may be configured and arranged to provide a database with a set of virtual office features available to remotely-situated client entities based on a subscription. Also, as described herein, the client entity may provide (via the VoIP provider) the set of virtual office features or call routing capabilities to a plurality of end-users. The method may include generating at a client server communicatively coupled to the VoIP server, programming instructions, in response to receipt of the event data and according to a respective set of directives for a particular client entity. The client server may be configured and arranged to provide the programming instructions for a respective client entity in a programming language that defines a message exchange protocol between the VoIP server and data sources. Moreover, the VoIP server may adjust the set of virtual office features available to end-users of the particular client entity according to and responsive to the client-specific sets of control data derived from the programming instructions. The VoIP server may subsequently provide the set of adjusted virtual office features to the end-users of the particular client entity via the client server.

To provide a simplified, yet customizable solution that protects the security of the underlying VoIP system and client entity data, the set of adjusted virtual office features may be provided to the end-users of the particular client entity in a programming language that includes call flow commands for call routing logic (such as an XML language, XML-derivative language, or other language described herein). Moreover, the virtual office features may be dynamically adjusted to account for changing needs of the client entity. As such, the set of adjusted virtual office features may be revised via the VoIP server, responsive and according to additional sets of client-specific control data derived from programming instructions received from the particular client entity. For instance, the set of adjusted virtual office features may be revised via the VoIP server responsive and according to instructions configuring customized alerts for the particular client entity. Such customized alerts can define a manner in which alerts and/or reminders are provided to end-users of the client entity. For instance, a client entity may submit a request to the VoIP server to send an alert to a particular end-user, with instructions on what to include in the alert and a manner in which the alert should be provided (e.g., by text message, voice message, by email, etc.). In another example, the client entity may submit a request to the VoIP server to send a reminder to a subset of end-users (as specified in the request), by providing programming instructions to the VoIP server. In such a manner, an end-user of the client entity (such as a supervisor and/or administrator) may send a reminder to a group of individuals reminding them of an upcoming event, such as a meeting, holiday, and/or other scheduled occurrence. Moreover, a client entity may provide desktop sharing, and thereby allow remote access and remote collaboration on a person's computer desktop through a graphical terminal emulator. As the client entity grows (or constricts, as the case may be), the client entity may adjust policies that govern desktop sharing provided by the VoIP server. As such, the client-specific sets of control data may define virtual network configurations for end-users of the shared desktop, or other aspects of desktop sharing.

Turning now to the figures, FIG. 1 shows a block diagram of a system for providing VoIP communication for endpoints of a plurality of client accounts, consistent with embodiments of the present disclosure. The system includes a VoIP communication server 110 configured to provide VoIP communications for a plurality of endpoint devices 152, 154, 156, 162, 164, and 166 connected in one or more data networks 130 and 140. The endpoint devices may include VoIP-enabled devices (e.g., IP phones, smart phones, tablets, and/or desktop computers with appropriate VoIP software applications) and/or non-VoIP endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the VoIP communication server. Registered devices for each client account may be listed in a respective account settings file (not shown) stored by the VoIP communication servers 110. In this example, endpoint devices 152, 154, and 156 are associated within an account 150 for a first client A and endpoint devices 162, 164, and 166 are associated within an account 160 for a second client B.

The system includes one or more processing circuits configured to implement client-specific control engines 120, which are configured to adjust the VoIP communications provided for each client account according to a respective set of control directives. For instance, the client-specific control engines 120 may adjust routing of a VoIP call for a client account by generating programming instructions (from which client-specific sets of control data are derived) to the VoIP communication server 110. For example, the client-specific control engines 120 may generate programming instructions by processing the respective set of control directives for the account in response to VoIP call event data or other data prompts received from the VoIP communication server(s) 110. For instance, the control directives for a client account may be configured to adjust routing of a particular VoIP call in response to call event data indicating a new incoming call to an endpoint of the client account. Additionally, the control directives for a client account may be configured to specify a manner in which alert(s) and/or reminder(s) are to be sent to particular target destinations.

The control directives for a client account may define the programming instructions based on various data metrics including, for example, VoIP call events or data received from the VoIP communication server, user input (e.g., input via dial-tones and/or GUI), data acquired from a client (e.g., from a client database), and/or data provided by third parties (e.g., third party monitoring services). The client-specific control engines 120 communicate the programming instructions to the VoIP communication server(s) using an interface protocol having an instruction format that is independent of an instruction format used to implement the client-specific control engines 120 and/or client-specific control directives. The independent instruction format of the interface protocol allows clients to write programming instructions including complex logic and various data sources, for example, using various different high-level languages without regard to the particular language used to implement or communicate with the VoIP provider server. In some embodiments, the instruction set of the interface protocol may be configured to limit customer control over certain VoIP communication settings—thereby preventing clients from disrupting operations of the computing service with faulty client-specified directive code.

Different embodiments may implement the client-specific control engines 120 in various locations. For example, client-specific control engines 120 for one or more client accounts may be implemented in a central server connected to, or incorporated with, the VoIP communication server(s) 110. Additionally or alternatively, one or more client-specific control engine(s) 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

Figure 2:
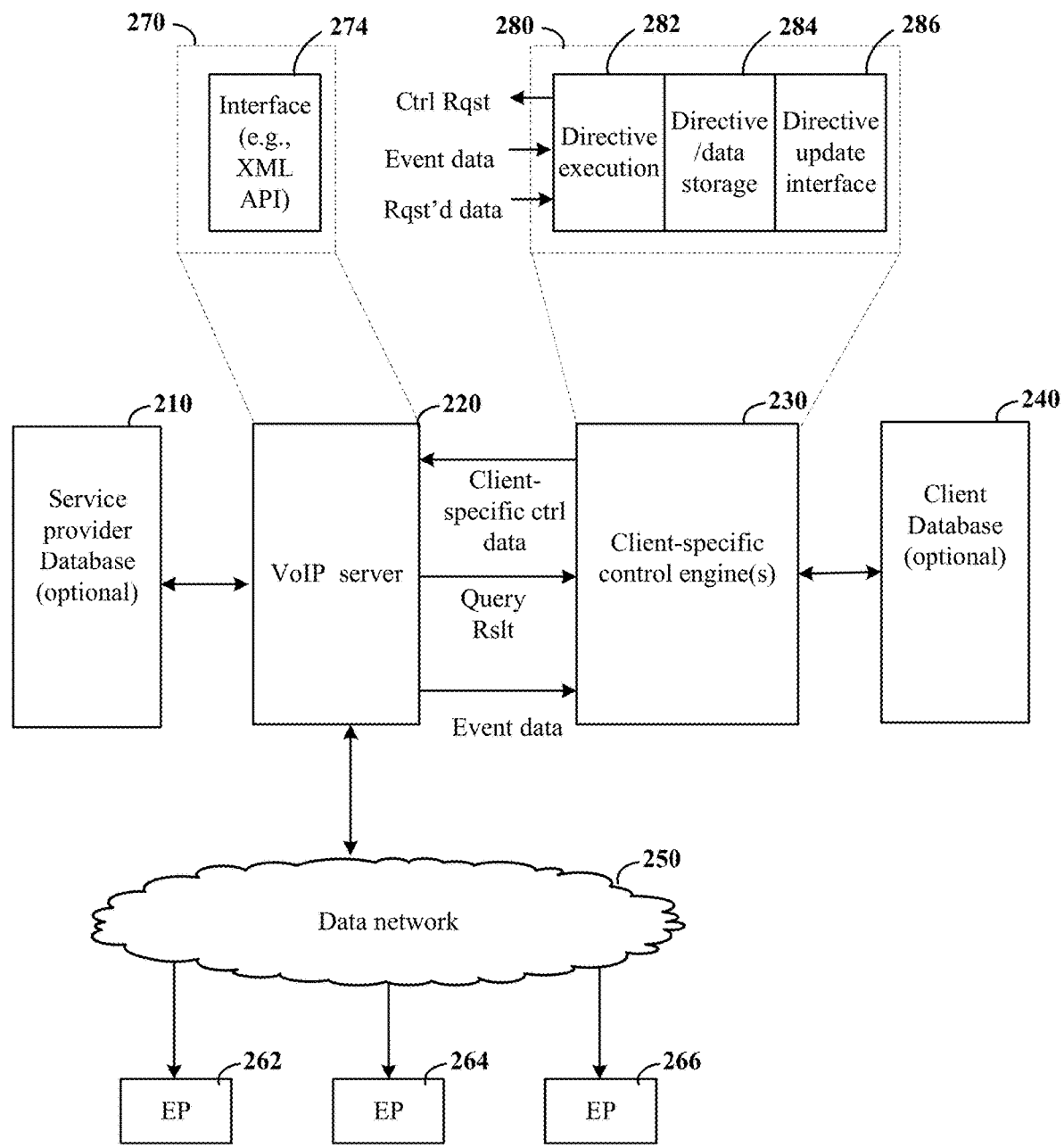
FIG. 2 is a block diagram of a call control engine with high-level programmable language logic for two different languages, consistent with embodiments of the present disclosure.

As previously described, client-specific control engines may be used to facilitate adjustment of a variety of virtual office features including, for example, VoIP communication services such as VoIP calls, audio and/or video conferencing, IPBX exchange servers, packet switching, and traffic management as well as non-VoIP services including, but not limited to, website hosting, remote data storage, remote computing services, virtual computing environments. One or more of such virtual office features may be provided, for example, by a cloud computing network having one or more servers configurable to provide a VoIP system for a plurality of clients. FIG. 2 shows a block diagram of an example system for providing virtual office features for endpoints of a plurality of client accounts, consistent with embodiments of the present disclosure. The system includes a VoIP provider server 220 configurable to provide one or more virtual office features for a plurality of endpoint devices 262, 264, and 266 connected in a data network 250. The endpoint devices may include VoIP-enabled devices (e.g., IP phones, smart phones, tables, and/or desktop computers) and/or non-VoIP endpoint devices (e.g., plain old telephone service (POTS) telephones and cellular-capable devices). Each endpoint device is respectively associated with an account of a respective client.

The system includes a processing circuit(s) configured to implement client-specific control engines 230. The client-specific control engines 230 are configured, as described with reference to client-specific control engines 120, to adjust the virtual office features (e.g., VoIP communications)

provided for each client account according to a respective set of control directives. For instance, the client-specific control engines 230 may dynamically adjust settings for the virtual office features provided for a client by VoIP provider server 220 according to the one or more sets of control directives specified for the client account.

As described with reference to FIG. 1, the control directives for a client account may define programming instructions based on various data metrics including for example, VoIP call events or data received from the VoIP communication server, data acquired from a client (e.g., from a client database), and/or data provided by third parties (e.g., third party monitoring services). In some embodiments, the control directives may cause the client-specific control engine 230 to query data from a client database 240 or from a service provider database 210. For example, the control directives may cause the client-specific control engine to retrieve a prerecorded message from a client database 240, where the message provides an alert or a reminder that is to be sent to a target destination. In another example, the control directives may cause the client-specific control engine to retrieve information from a service provider database, such as an emergency management database, in order to provide an alert related to emergency conditions to particular end-users.

The client-specific control engines 230 communicate the programming instructions to the VoIP communication server(s) using an interface protocol having an instruction format that is independent of an instruction format used to implement the client-specific control engines 230 and/or client-specific control directives.

As previously described, the independent instruction format of the interface protocol allows clients to write programming instructions from which client-specific sets of control data are derived, for example, using their preferred high-level programming and/or may be used to limit customer access and/or control over the VoIP provider server. For example, the interface protocol may be configured to allow the client-specific control engines to specify particular alerts or reminders that may be created by end-users of the client entity, without allowing direct access to the raw data of the VoIP service provider. Similarly, the client-specific control engines may be configured to automatically provide alerts or reminders to end-users or subsets of end-users in response to particular criteria being satisfied. For instance, the client specific control engines may be configured to send a reminder to all employees of a particular client entity the day before a scheduled holiday closure. In another example, the client specific control engines may be configured to allow end-users to create particular alerts, such as alerts that are to be received on their mobile device, when correspondence is received from a particular individual or contact.

As described with reference to FIG. 1, client-specific control engines 230 may be implemented in various locations. For example, client-specific control engines 230 for a particular client account may be implemented in the VoIP provider server(s) 220, in a separate processing circuit communicatively connected to the VoIP provider server(s) 220, using one or more processing circuits of the client, or a combination thereof.

The VoIP provider server 220 and client-specific control engines 230 may be implemented using various circuit arrangements. Block 270 shows an example implementation of a VoIP provider server configured to provide a VoIP IPBX service for a client. The example VoIP provider server 270 includes one or more IPBX server(s) configured to establish and direct VoIP calls for a plurality of endpoints of a customer account. Interface circuit 274 is configured to allow different client specific control engines to communicate with the VoIP provider server 220 via a common high-level language instruction set (e.g., a set of XML instructions).

Block 280 shows an example implementation of a client-specific control engine 230. In this example, the client-specific control engine includes a storage circuit 284 configured to store control directives and/or data for one or more client accounts. Directive execution circuit 282 is configured to provide client-specific control of the remote services provided for a client via execution of the control directives for the client stored in storage circuit 284. In some implementations, the directive execution circuit 282 is configured to communicate programming instructions to the VoIP provider server 220, for example, via an interface, using a high-level language instruction set (e.g., a set of extensible meta-data language (XML) instructions). Additionally or alternatively, the directive execution circuit 282 may retrieve one or more sets of directives from an external source (e.g., a client database). In this example, the client-specific control engine shown in block 280 includes a directive update interface circuit 286 configured to facilitate upload and/or editing of control directives for a client account.

Figure 3:
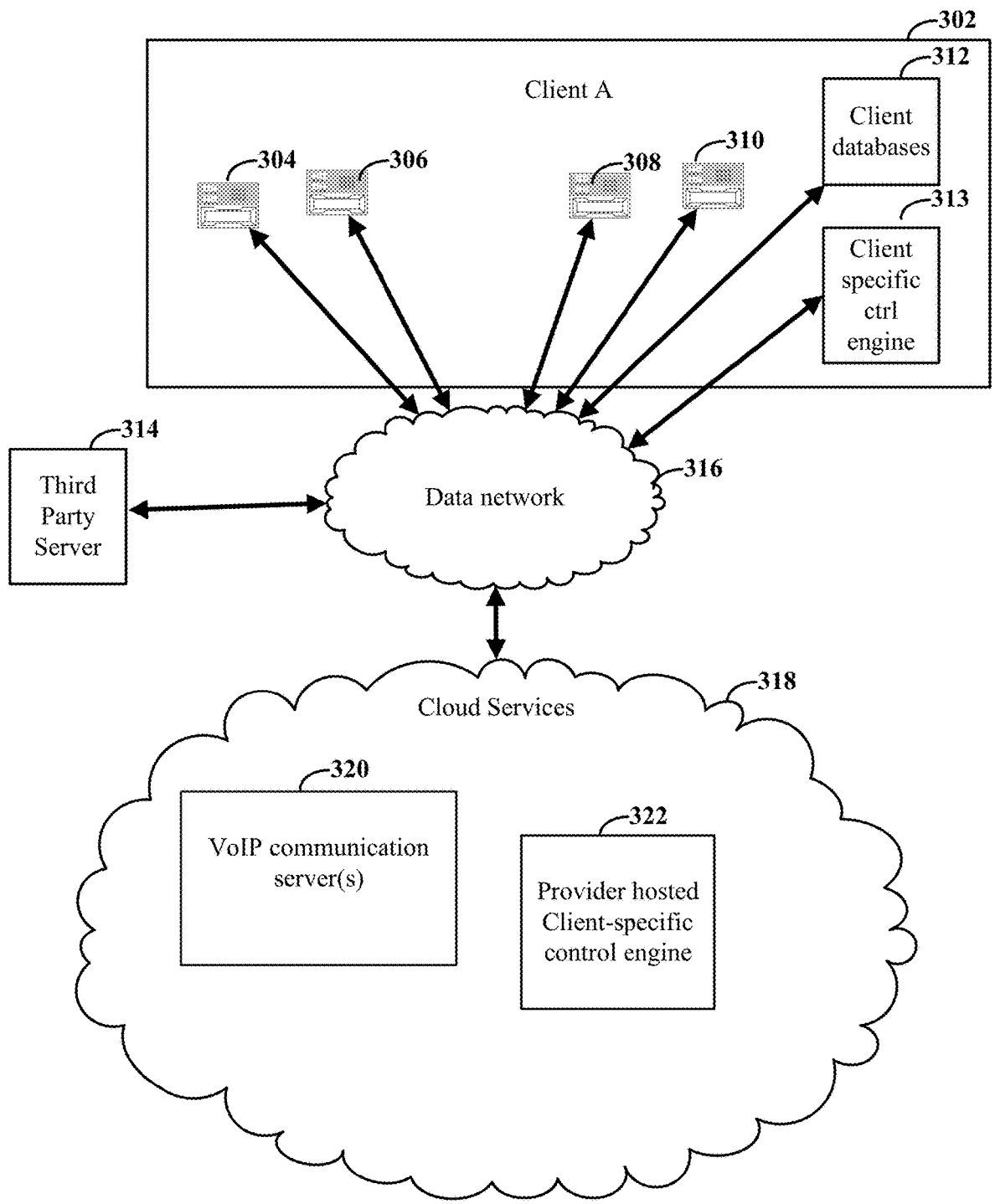
FIG. 3 is a block diagram showing the use of a hierarchy of programmable language documents, consistent with embodiments of the present disclosure.

FIG. 3 is a diagram for a system that uses a high-level programming language for call control operations, consistent with embodiments of the present disclosure. In connection with these specifically-illustrated examples, VoIP endpoint devices 304, 306, 308, and 310 connected in a data network 316 are configured to place and receive VoIP telephone calls between other VoIP endpoint devices, and/or between non-VoIP endpoint devices. Non-VoIP endpoint devices may include, for example, plain old telephone service (POTS) telephones and cellular-capable devices, which might also be VoIP capable (e.g., smart phones with appropriate VoIP software applications). The various endpoint devices include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VoIP endpoint devices can include, but are not limited to, desktop computers, mobile (smart) phones, laptop computers, and tablets. When each of the endpoint devices originates or receives a call in a telephone network, each can be characterized or referred to as an addressable call endpoint or a dial peer. Similarly, as discussed herein, the VoIP endpoint devices 304, 306, 308 and 310 are configured to send and receive alerts and/or reminders between other Vol? endpoint devices, and/or between non-VoIP endpoint devices.

The call routing and other services for the VoIP telephone calls can be provided by one or more VoIP servers 320 within a cloud services system 318 (e.g., configured to provide virtual office features to customers of the VoIP provider). In particular example embodiments, the VoIP servers 320 can be located within the cloud services system 318. The cloud services system 318 also includes one or more provider hosted client-specific control engines 322, configured as described with reference to 230 in FIGS. 2 and 120 in FIG. 1. A client-specific control engine 313 may also be implemented locally by a client (e.g., 302). In some embodiments, data centers can be part of a cloud services system 318 where the hardware providing the cloud services is located in a number of different data centers with different physical locations. Consistent with embodiments, the cloud services can include SIP servers, media servers, and servers providing other services to both VoIP endpoint devices and the users of the VoIP endpoint devices. In some instances, the various servers, including both the VoIP servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a VoIP server uses session initiation protocol (SIP) to handle various call functions (e.g., call setup and tear down); however, the various embodiments discussed herein are not necessarily limited thereto. Consistent with the above and other embodiments disclosed herein, the VoIP servers can be configured to establish a leg of the call from the VoIP endpoint devices (or dial peers) to another VoIP endpoint device, or to a gateway.

According to various embodiments, a client specific control engine may specify a time and/or manner in which alerts and/or reminders are provided to/from endpoint devices. A client entity may provide instructions, written in a high level programming language compatible with the high level programming language used by the VoIP service provider, to specify how and when a particular alert is to be sent to end-users of the client entity. Such alerts may relate to emergency conditions, to receipt of incoming communications, to scheduled events, and/or completed milestones, among other examples. The client entity may also provide instructions written in the high level programming language that specifies how and when reminders are to be sent to end-users of the client entity. For instance, the instructions may specify that end-users receive a text message on a mobile device, and/or a pop up message on a mobile device inviting the end-user to participate in a scheduled meeting. In another example, the instructions may specify that an end-user or group of end-users are to be notified of an upcoming due date by email and/or voice message.

Consistent with certain embodiments, the VoIP server can be configured to interface with customer databases 312, or with third party servers 314. For instance, client specific control data stored by the cloud services system 318 can identify, based upon a received call, a Uniform Resource Identifier (URI) that points to customer databases 312, or to a third party server 314. Control directives provided from these servers, for example, in the form of a high level programming language, can be used to specify a manner in which alerts and/or reminders may be provided to end-users of a client entity, as described herein.

Figure 4:
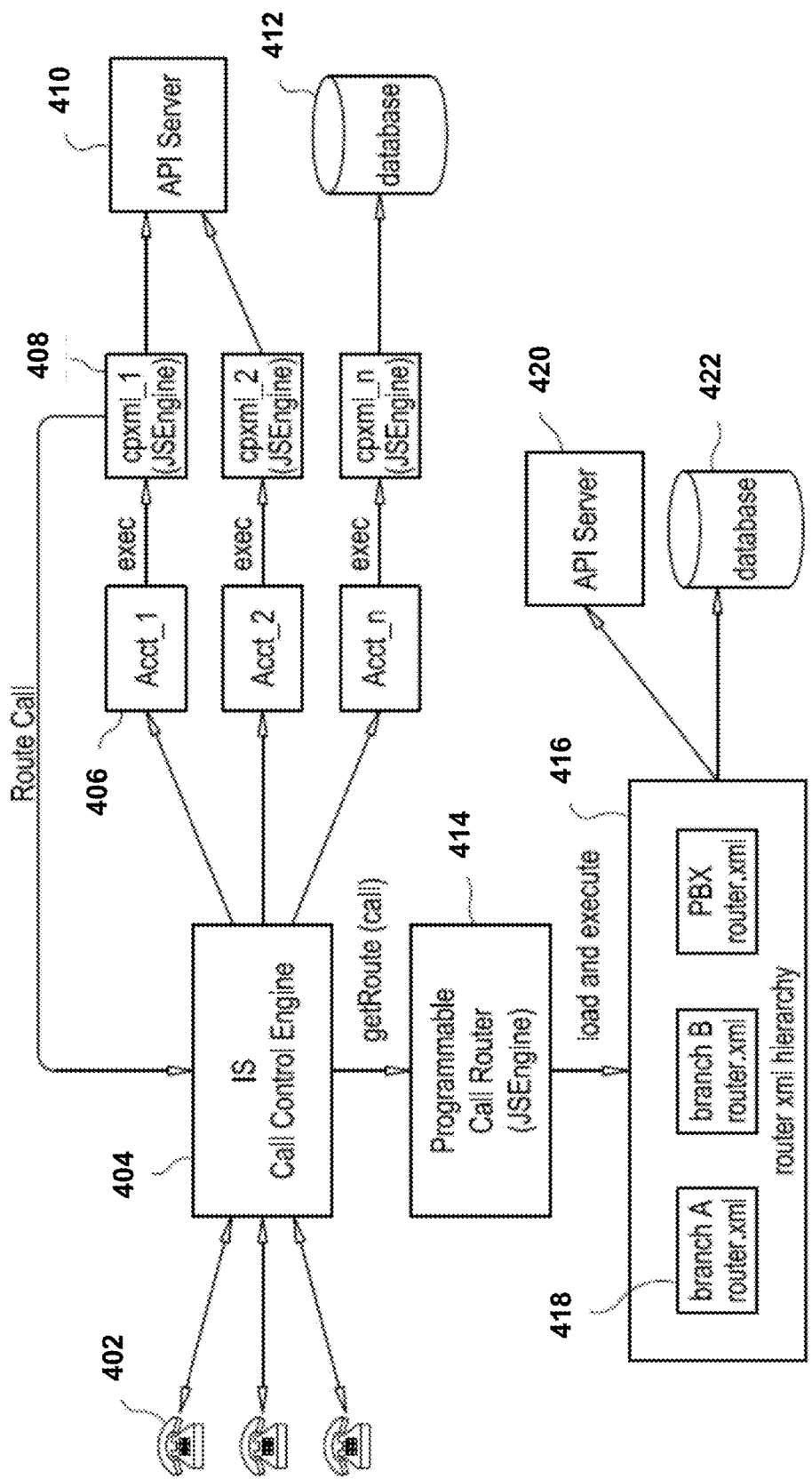
FIG. 4 is a block diagram showing the use of a hierarchy of programmable language documents, consistent with embodiments of the present disclosure.

FIG. 4 is a block diagram showing the use of a hierarchy of programmable language documents, consistent with embodiments of the present disclosure. Call control engine 404 can provide call flow control and routing in a manner that can be consistent with discussions found herein and relating to call control engines, VoIP servers, and the other figures. Consistent with various embodiments, the call control engine 404 is a PBX that is part of a VoIP system. For instance, the PBX can be configured using Java-based applications that manage voice over IP (VoIP) networks. The PBX can be hosted by a VoIP service provider and located at one or more data centers. Various PBX features can be provided, such as call forwarding, remote pickup, call routing, and voice mail.

Consistent with various embodiments, customers of a VoIP provider can use the VoIP system by generating documents written in compatible high-level programming languages, as described herein. Together, the documents specify how the customer would like call intercept to be handled for both inbound and outbound calls, and for how alerts and/or reminders are to be provided to end-users of the client entity. For instance, instructions 408 can be associated with an extension account 406, or with groups of extension accounts. The extension accounts 406 can represent a specific individual and their associated extension number(s). Instructions 408 that are configured in this manner will be invoked by the call control engine 404 after an incoming call is routed to an extension that has call routing capabilities enabled. The instructions may provide logic for sophisticated call flow call control functions for outbound calls. For example, alerts (e.g. text messages and email messages) can be automatically generated in response to outgoing calls and restrictions can be placed on outbound calls based upon factors such as time of day or call history. In another example, reminders may be automatically generated in response to an upcoming event scheduled in a scheduling application integrated with the VoIP system.

The call control engine 404 may also consult with call routers 414. The call routers can be programmed using documents 418 written in a high level programming language, and with JavaScript for dynamic data access and logic handling. The documents 418 written in the high level programming language can be arranged in a router xml hierarchy 416, which can specify different documents 418 depending upon the branch or PBX that is identified as corresponding to the call. Once the call router documents are loaded, they can be cached in memory and used by the call control engine 404 to make a routing decision. When a call is routed through the call control engine 404, the call control engine can consult with high-level documents. The branch level can be identified, for example, based on the branch Id of caller (for outbound calls) or callee (for inbound calls). Delineations other than the branch are also possible, such as by the called country, the particular store, the state, or other.

According to particular embodiments, the programmable call routers 414 can be viewed as plugins to the call control engine 404. The call router plugins may have two levels—Branch and PBX levels. The call router supports high-level programming languages that specify how the PaaS can be utilized by a customer. For example, the high-level programming language can define sets of conditional statements, data access requests, and call routing commands: if/else, condition, goto, log, var, script, query, data, accept, reject, route statements, or other similar commands. The VoIP client server can receive from the VoIP provider server, a set of instructions written in a first programming language (e.g., a first form of the high-level programming language) that defines a message exchange protocol between the VoIP provider server and data sources. The VoIP client server can further generate programming instructions written in a second programming language (e.g., a second form of the high-level programming language) that is a subset of the first programming language. The second programming language may be considered a subset of the first programming language, and is associated with virtual office features available to the client entity. This distinction can be useful for keeping the documents including the programming instructions light weight so that call routing decisions are simplified and efficient. Using such programmable call routes, a few example uses include: school district that generates SMS/Email alerts to parents whenever an emergency number is dialed; off hour restriction of outbound call with CPXML; call center lockdown to provide outbound dialing restriction for phones; computer initiated dialing with caller identification (ID) override based destination database table, and call return to target DID/agents; and implementation of a call black list (denying calls to/from the list) or white list (allowing calls to/from the list) with potentially large lists and dynamic updating capabilities.

Consistent with embodiments of the present disclosure, both CRXIVIL and CPXML provide the capability of handling dynamic data from multiple sources. Examples of these sources are depicted as application program interface servers 410, 420 and databases 412, 422. The dynamic data can therefore be provided from a variety of sources including, but not necessarily limited to, call route session data (caller id, callee id, or route from/to), query custom object (to a database) in the VoIP provider system/cloud, and access data through HTTP RESTful API. For instance, the XML documents can include a web resource that is identified by Uniform Resource Identifiers. The web resource might be a customer HTTP server that responds to a conditional query (e.g., whether or not a call queue is above a threshold) with CPXML code that instructs the call control engine on how to route, or otherwise handle, the call. In such a manner, client-specific sets of control data provided by the call control engine may allow for adjusted (e.g., customized) virtual office features for end users (such as 402) of the VoIP system.

Figure 5:
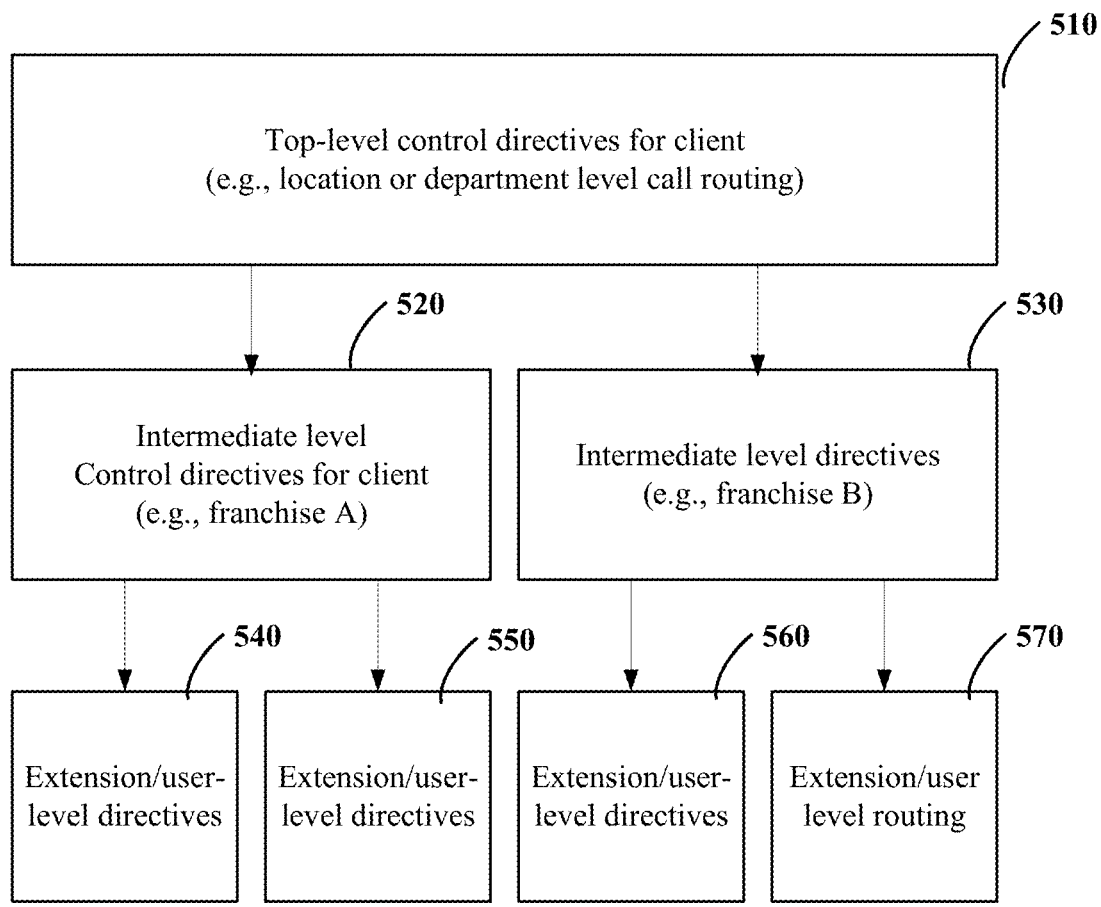
FIG. 5 is a block diagram showing an example set of control directives configured for multiple levels of control, consistent with embodiments of the present disclosure.

FIG. 5 is a block diagram showing an example set of control directives configured for multiple levels of control, consistent with embodiments of the present disclosure. The control directives described herein can be used to form programming instructions (from which client-specific sets of control data are derived) which can be transmitted to the VoIP provider for adjusting the virtual office features provided to the client entity. In this example, block 510 provides a set of top-level control directives that are applicable to all VoIP calls for a client. Blocks 520 and 530 show a set of intermediate-level control directives that are applicable only to a subset of endpoints included in the client account (e.g., for respective IPBXs, branches, department, and/or franchisees). Blocks 540, 550, 560, 570 are shown as lower-level control directives that are applicable to particular extensions and/or end-users of the client account. The lower-level control directives may be useful, for example, for an end-user to customize and/or dynamically adjust direction of calls to an extension throughout the day.

Figure 6:
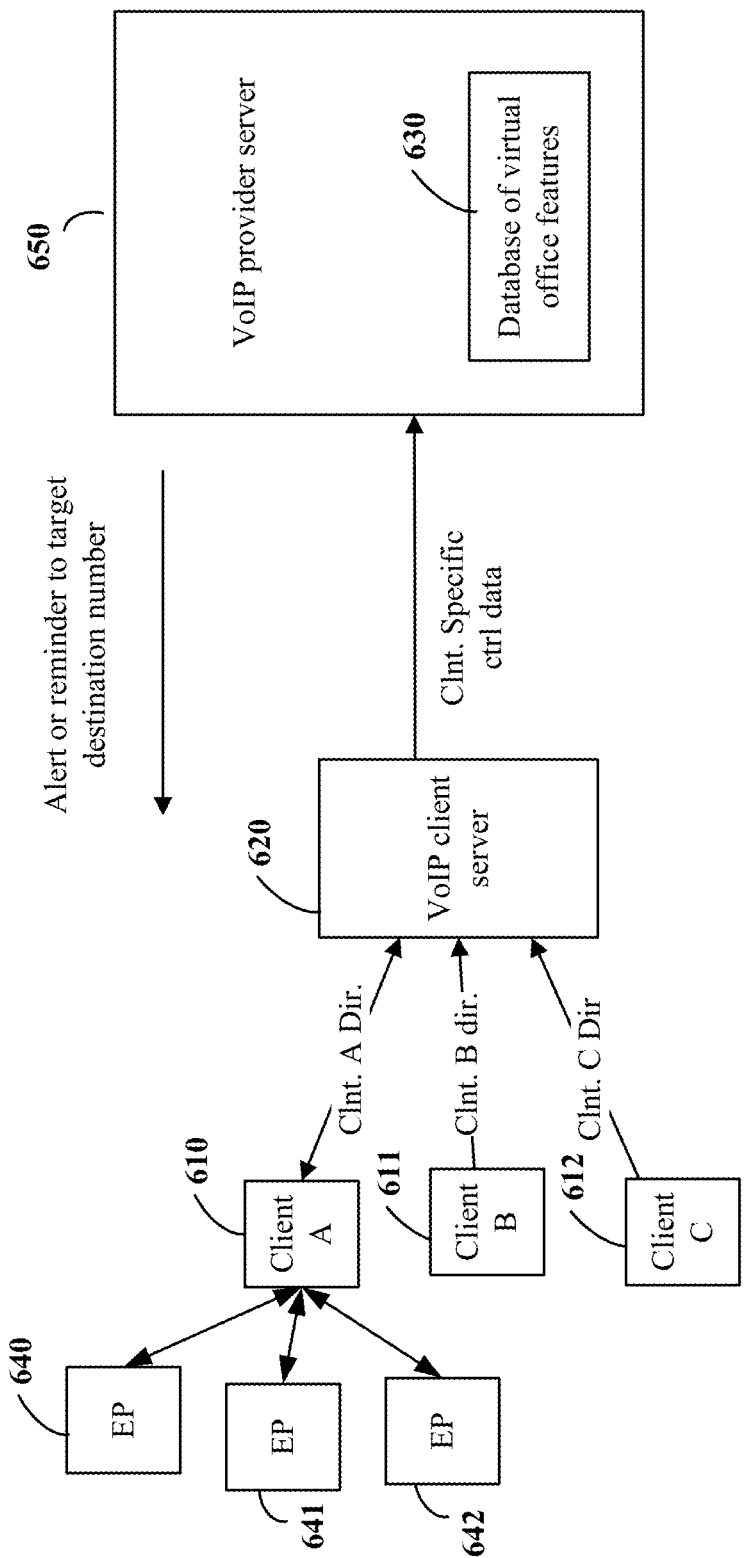
FIG. 6 is a block diagram showing the customization of telecommunications services, consistent with embodiments of the present disclosure.

FIG. 6 shows a block diagram including a VoIP provider server (e.g., 650) and a VoIP client server (e.g., 620) configured to provide customized telecommunications services to various client entities 610, 611, and 612. As discussed herein, each client entity 610, 611, and 612 may be configured to interface with a VoIP provider server 650 providing a database of virtual office features available based on a subscription, via a VoIP client server 620. Each of a plurality of client entities 610, 611, and 612 may be associated with one or more different end-users 640, 641, and 642. The VoIP provider server 650 may provide a database of virtual office features 630 that are available to the client entities 610, 611, and 612 based on a subscription.

To provide a customized set of virtual office features to the end-users of a particular client entity, the VoIP client server 620 may provide instructions to the VoIP provider server 650 defining aspects of virtual office features to be provided to end-users of the particular client entity. Such instructions may be written in a particular programming language, as described herein. For instance, client entity A (e.g., 610) may provide a set of client-specific directives to the VoIP client server 620. The VoIP client server 620 may generate client-specific sets of control data for client A based on the received client-specific directives. The client-specific sets of control data for client A may be received by the VoIP provider server 650, and used to provide an adjusted set of virtual office features for client entity A.

As described herein, each client entity (e.g., client entity 610, 611, and 612) may specify alerts and/or reminders to be provided to the endpoint devices, as specified in the client specific control data. For example, client A may provide instructions to send an SMS alert to endpoint devices (also referred to herein as end-users) when certain criteria are satisfied, such as when certain emergency criteria are satisfied. As such, the VoIP client server (e.g., 620) may provide client-specific sets of control data to VoIP provider server 650 defining the alerts to be provided to each of the different end-users of client A. Similarly, client B (e.g. 611) and client C (e.g., 612) may send directives to the VoIP client server 620 defining aspects of different and/or additional alerts and/or reminders to end-users of the respective clients. In such a manner, each of clients A, B and C may provide customized virtual office features, including customized alerts and/or reminders, to end-users without added overhead and programming by the VoIP telecommunications service provider, while also maintaining the integrity and security of the underlying system.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (VoIP) endpoint device (or endpoint) includes a communication circuit and (computer) processing circuits which are configured to establish (VoIP) communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A method for use in a data-communications system including a data-communications server which is to provide data communications over a broadband network with a user endpoint device, the method comprising:
   communicating, via computer processor and communications circuitry which is communicatively integrated with the data-communications server, with the user endpoint device by using instructions written in a first programming language, and by routing communications to the user endpoint device;
   receiving, from the user endpoint device, client-specific programming instructions that correspond to or are written in a second programming language, that provides client-specific instructions and that are compatible with the first programming language and with a set of virtual office data-communications features; and
   controlling, via call control circuitry, the set of virtual office data-communications features to be provided by the data-communications server to the user endpoint device and, in response to an incoming communication involving the user endpoint device and to the client-specific instructions, providing an alert or other informative communication to the user endpoint device.

2. The method of claim 1, wherein the data-communications server includes a plurality of servers, each of which includes a computer circuit.

3. The method of claim 1, wherein the set of virtual office data-communications features includes multiple types of data-communications available for use by the user endpoint device.

4. The method of claim 1, wherein the set of virtual office data-communications features includes multiple types of data-communications from among the following: text message, voice message, and email.

5. The method of claim 1, wherein the user endpoint device is from among the following: an IP phone, smart phone, tablet, and a desktop computer.

6. The method of claim 1, wherein the call control circuitry is to provide the alert or other informative communication based on the client-specific programming instructions that correspond to or are written in the second programming language.

7. The method of claim 6, wherein the alert or other informative communication is an appointment reminder, and the call control circuitry provides the alert or other informative communication to a user of the user endpoint device by interrupting an in-session call on the user endpoint device.

8. The method of claim 1, wherein the alert or other informative communication is based on data provided to the data-communications system via the client-specific programming instructions.

9. The method of claim 1, wherein the client-specific programming instructions cause the call control circuitry to adjust the set of virtual office data-communications features provided to the user endpoint device.

10. The method of claim 1, wherein the client-specific programming instructions include certain criteria, and the client-specific programming instructions direct the data-communications server to provide the alert or other informative communication in response to the certain criteria being satisfied.

11. The method of claim 1, wherein the call control circuitry identifies a current location of the user endpoint device, and based on the current location, selects a format or type of message of the alert or other informative communication.

12. The method of claim 1, wherein the call control circuitry discerns that the user endpoint device is in movement or in a moving vehicle and in response, provides the alert or other informative communication by voice message.

13. The method of claim 1, wherein the user endpoint device is one of a plurality of user endpoint devices linked to a remotely-situated client entity for which the data-communications server is configured to convey data-communications services at a plurality of different locations as specified by the remotely-situated client entity.

14. The method of claim 1, wherein the user endpoint device is one of a plurality of user endpoint devices linked to a remotely-situated client entity for which the data-communications server is configured to convey data-communications services at a plurality of different locations as specified by the remotely-situated client entity, and the call control circuitry is to provide and control virtual office features differently for each of multiple franchises or other client-related entities according to data received in the client-specific programming instructions.

15. The method of claim 1, wherein the user endpoint device is one of a plurality of user endpoint devices linked to a remotely-situated client entity for which the data-communications server is configured to convey data-communications services, and the data-communications server communicates with the plurality of user endpoint devices via one or more PBXs controlled on behalf of the remotely-situated client entity.

16. The method of claim 1, wherein the data-communications server is configured to provide data-communications services over the Internet and by use of data-analytics operations.

17. The method of claim 1, wherein the first programming language and the second programming language include a type of instructions consistent with at least one eXtensible Markup Language (XML).

18. A storage device including stored programming instructions for use in a data-communications system having a data-communications server and having call control circuitry, the data-communications system to provide data communications over a broadband network with a user endpoint device, wherein the data-communications server includes computer circuitry which operates based on computer commands written in a first programming language by routing communications to the user endpoint device, the stored programming instructions causing the computer circuitry to carry out a series of steps comprising:

receiving, from the user endpoint device, client-specific programming instructions that correspond to or are written in a second programming language, that provides client-specific instructions for use by a call control engine, and that are compatible with the first programming language and with a set of virtual office data-communications features; and controlling, via call control circuitry, the set of virtual office data-communications features to be provided by the data-communications server to the user endpoint device and, in response to an incoming communication involving the user endpoint device and to the client-specific instructions, providing an alert or other informative communication to the user endpoint device.

19. A data-communications system comprising:

a data-communications server which is to provide data communications over a broadband network with a user endpoint device;

call control circuitry;

computer processor and communications circuitry, communicatively integrated with the data-communications server, to communicate with the user endpoint device by:

using instructions written in a first programming language, and by routing communications to the user endpoint device;

receiving from the user endpoint device, client-specific programming instructions that correspond to or are written in a second programming language, that provides client-specific instructions and that are compatible with the first programming language and with a set of virtual office data-communications features; and controlling, via the call control circuitry, the set of virtual office data-communications features to be provided by the data-communications server to the user endpoint device and, in response to an incoming communication involving the user endpoint device and to the client-specific instructions, providing an alert or other informative communication to the user endpoint device.

\* \* \* \* \*